Jan. 28, 1958   F. BRENDEL   2,821,239
TRAILER SEAT
Filed Dec. 18, 1953
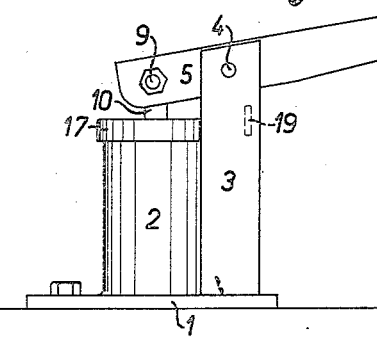
Fig. 1
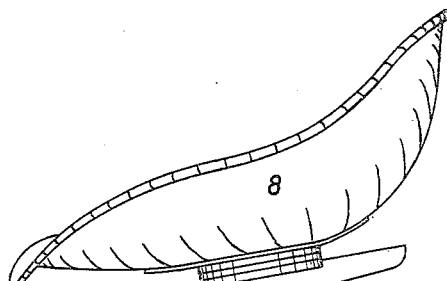
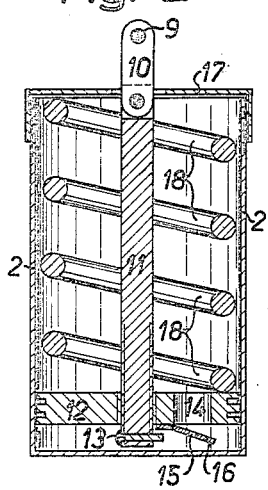
Fig. 2
Fig. 3
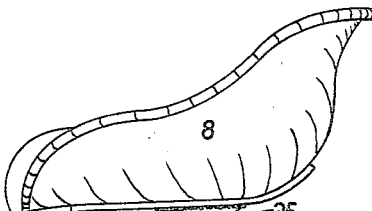
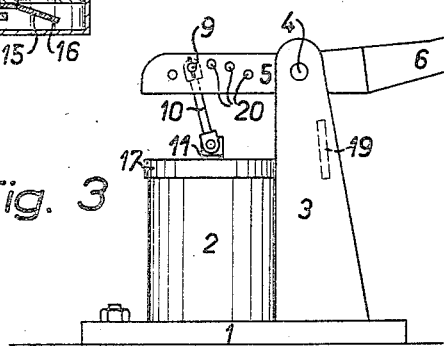
Fig. 4
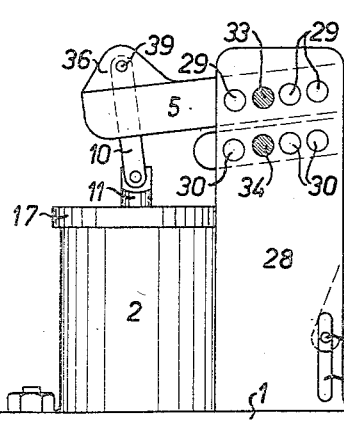
INVENTOR:
FRIEDRICH BRENDEL
BY:

United States Patent Office 2,821,239
Patented Jan. 28, 1958

2,821,239

TRAILER SEAT

Friedrich Brendel, Homburg, Saar

Application December 18, 1953, Serial No. 399,121

Claims priority, application Germany January 20, 1953

6 Claims. (Cl. 155—9)

It is a known fact that the seating shell generally used for the rider on agricultural trailers and similar vehicles, usually arranged on a strong leaf spring, often gives rise to accidents, since on uneven ground the rider is thrown off by the violent swinging and whipping movement of the leaf spring carrying the seating shell.

The present invention relates to a trailer seat which may also be fitted to any agricultural apparatus using the existing seating shell and which on the one hand ensures the necessary springing and on the other hand is provided with a shock absorber arrangement which at the same time contains the spring member; and moreover, without the need for any fitting of the device or the like, allows of the adjustment of the spring tension in a simple manner to correspond to the weight of the rider.

This new type of trailer seat consists in principle of a double-armed lever on the one arm of which is arranged the seating shell while on the other arm, which is preferably shorter, there engages a piston rod the piston of which forms the seating of a spiral spring under pressure and which is provided with a valve from which the piston obtains its shock absorbing properties.

In order to adapt the seat carrier to different weights of the rider, the pressure of the spring in the shock absorber chamber can be altered. For this purpose the shaft of the piston, surrounded by the spiral spring, is provided with a screw thread at the end attached to the piston. In order to change the spring pressure the piston shaft, after loosening the connection at its upper end, is turned to screw it in or out to a greater or less extent in the shock absorber piston which is acted on by the spiral spring, whereby a stop arranged at its lower end prevents it from screwing completely out of the piston.

Instead of changing the pressure of the spiral spring which acts on the piston of the shock absorber and altering the characteristic of the spring, the effective spring power alone may be altered while retaining the spring characteristic, by changing the spring arm ratio, in which case the load the seat carrier is adjusted to can be seen directly from the particular position of the different lever arms.

According to the invention, in order to change the effective spring strength, the length of the short arm, acted on by the spring, of the double-armed lever carrying the seating shell is altered.

In order to attain a continuous variability of the effective spring strength there can be arranged a slide or the like, for example actuated by a screw spindle and displaceable in the short lever arm, in which the upper joint pin of the link connected with the piston shaft which is acted on by the spring is carried.

To simplify the construction there can be arranged in the short arm of the double-armed lever and/or in the support forming the bearing strut of this double-armed lever two or more pairs of holes registering with one another, whose parallel axes lie approximately in a horizontal plane, whereby each time two holes registering with one another are used to take the hinge pin at which the link engages or which forms the hinge axis of the double-armed lever.

To secure the push-in link pins against unintended falling out, there may be provided any desired known and preferably spring-controlled locking members, locks, split pins, etc. Additional safety devices may be provided so as to avoid accidents in case a pin should fall out the positive connection between the lever carrying the seating shell and the piston of the shock absorber which is acted on by the spring.

In addition the trailer seat carrier can be equipped with a parallelogram guiding, so that the angle of inclination, once adjusted, of the seating shell remains unchanged at all height positions, as the seating shell always moves parallel to itself.

All further details of the invention follow from the following description in combination with the diagrams on which are shown three constructional examples of a trailer seat according to the invention.

In detail these are:

Fig. 1—a side view of a trailer seat;

Fig. 2—an axial section through the cylinder containing the pressure spring and the shock absorbing piston;

Fig. 3—a trailer seat with which in the short arm of the double-armed lever carrying the seating shell there are provided five pairs of holes registering with one another for the upper joint pin of the link;

Fig. 4—a seat carrier with parallelogram linking.

On the base plate 1, which is attached to the chassis by means of castle bolts or the like, are arranged the liquid-tight cylinder 2 and two vertical iron strips 3, which latter form the bearing strip, provided with the pins 4, of the double-armed lever 5/6 consisting for example of U-section iron. On the longer lever arm 6, which is provided with a longitudinal slot in a known manner, is attached also in a known manner the seating shell 8 by means of the nut 7.

On the shorter lever arm 5, by means of the cross bolt 9 and through the agency of the one-armed lever 10 serving as link, is attached the piston rod 11 of the piston 12 which is displaceable in the cylinder 2.

At the lower end the piston rod 11 is provided with a thread which can be screwed to a greater or less extent in the piston 12 and is provided at its lower end with a cross bolt or cross pin 13 for safety, by which an unnoticed turning of the piston rod out of the piston is prevented with certainty.

The piston 12 is formed with a passage 14 which is closed by a flap valve 16 having a bleed aperture 15 when the piston moves downwardly in the cylinder 2. The latter is filled with a suitable braking liquid such as oil, so that during downward movement of the piston 12 the braking liquid must pass through the bleed aperture 15 of the closed valve 16, whereas during upward movement the valve 16 is open and the braking liquid may flow more rapidly through the passage 14.

A pressure spring 18 is arranged within the cylinder 2, and one end of the spring abuts against the upper side of the piston 12 whereas the other end of the spring abuts against the lower side of the cover 17. The spring thus constantly urges the piston 12 downwardly, but this downward movement is braked or retarded by the above-described flap valve 16.

To ensure the seat against an undesired drop if one of the machine elements engaging on the short lever arm should break, between the iron strips forming the bearing strip is arranged the stop 19.

With the constructional example shown in Fig. 3, the link 10 between the short lever arm 5, having for example a U-shaped cross section, of the double-armed lever 5/6 carrying the seating shell 8 and the upper end of the piston rod 11 is formed somewhat longer.

In the lever arm 5 are five pairs of holes 20, registering with one another, at different distances from the joint pin 4 carried in the support 3; in any of these pairs of holes there can be inserted the upper joint pin 9, with which the link 10 is linked to the lever arm 5, as required, whereby it is secured against unintended coming out by a known and not shown safety device.

The greater the weight of the rider using the trailer, the greater must be the distance of the insertable link pin 9 from the link pin 4 forming the lever axis.

At the side of the single holes 20 there can be recorded the weight for which the particular position of the pin is intended.

With the constructional example of a seat carrier as shown in Fig. 4, the long arm 6, carrying the seating shell 8, of the double-armed lever 5/6 is provided with a parallelogram guiding which is formed by the parallel link 26 running parallel to the lever arm 6, the vertical link 27 carrying the seating shell at its upper end and the fixed support 28.

In the double-armed lever 5/6 and in the link 26 running parallel to it are arranged the pairs of holes 29 and 31 or 30 and 32, lying respectively vertically under one another, in which push-in link pins 33 and 35 or 34 and 36 forming the particular hinge axis can be pushed in, whereby the levers 6 and 26 are respectively connected with the support 28 and the links 27 carrying the seating shell 8 to form the jointed parallelogram.

With the constructional example shown the link 27 is also provided with two additional pairs of holes 37 for adjustment of height of the seating shell 8. At the upper edge of the lever arm 5 there is welded on the bearing strip 36, in which is linked the link 10, jointed to the piston rod 11, by means of the link pin 39.

By pushing the pins 33 and 34 in any pair of holes 29 or 30, lying above one another, of the lever arm 6 or 26, which holes register with corresponding pairs of holes at the upper end of the support 28, the length of the lever arm 5 and therewith the effective power of the pressure spring acting on the piston of the shock absorber can be altered as desired without changing the characteristic. By pushing the pins 35 and 36 inside the pair of holes 31 and 32, provided for them, of the levers 6 and 26, as also inside the pair of holes 37 arranged in the link 27, the height position of the seating shell 8 and its distance from the support 28 can be altered.

With this constructional form of the seat carrier in which the link 10 is swung only a small extent relative to the upward-extended axis of the piston rod 11, the horizontal forces acting at the upper end of the piston rod 11 can be neglected.

In order to avoid any downward swinging of the seating shell 8, giving rise to accidents, in the event of a spring breakage or resulting from the falling out of one or more link pins which are protected against it, there is linked to the link 26, by means of the fixed hinge pin 40, the link 41 which is guided inside the vertical slots 43, arranged in the support 28, by means of bolts 42 at its lower end.

The length of the slot 43 is so adjusted that on the one hand the swinging of the double-armed lever 5/6 carrying the seating shell 8 is not restricted under normal conditions, but that on the other hand a complete downward swing under the above-mentioned conditions of the lever arm 6 carrying the seating shell 8 is prevented with certainty, as the lower end of the slot 43 determines the lowest position of the double-armed lever 5/6.

By virtue of the above arrangements, inherent disadvantages of existing sprung rider seats are overcome, in particular, the disadvantages of rider seats in which the seat is connected to one end of a leaf spring fixed to the chassis and in which a shock absorber is provided which is formed as one-armed lever which is hingedly connected to the chassis and to the lower side of the seat. In such a seating arrangement, breakage of the leaf spring will leave the seat connected to the chassis solely by shock absorber, and this will inevitably result in the rider being thrown off the seat.

The present invention overcomes another inherent advantage of existing sprung rider seats in which the shock absorber is arranged directly beneath the seat. According to the present invention, the shock absorber is so located so that this space may be utilized for different purposes. This is particularly significant inasmuch as the seat is, in practice normally arranged above the center of gravity of the vehicle, so that in a vehicle incorporating a seating arrangement according to the present invention this valuable space need not be reserved for the shock absorber.

I claim:

1. A seating arrangement, comprising, in combination, support means; lever means having in the region of one free end thereof a seat portion and mounted on said support means for pivotal movement about a pivot axis intermediate the free ends of said lever means between a first position wherein said seat portion occupies an uppermost position and a second position wherein said seat portion occupies a lowermost position; and combined biasing and damping means connected to said support means and to said lever means in the region of the opposite free end thereof for biasing said lever means toward said first position thereof and for damping turning movement of said lever means from said first position thereof to said second position thereof whereby said lever means will be maintained in said first position thereof when said seat portion is empty and the downward movement of said seat portion of said lever means under the influence of a weight thereon will be damped.

2. A seating arrangement, comprising, in combination, support means; lever means having in the region of one free end thereof a seat portion, said lever means being mounted on said support means for pivotal movement about a pivot axis intermediate the free ends of said lever means between a first position wherein said seat portion occupies an uppermost position and a second position wherein said seat portion occupies a lowermost position; and combined biasing and hydraulic braking means connected to said support means and to said lever means in the region of the opposite free end thereof for biasing said lever means toward said first position thereof and for braking turning movement of said lever means from said first position thereof to said second position thereof whereby said lever means will be maintained in said first position thereof when said seat portion is empty and the downward movement of said seat portion of said lever means under the influence of a weight thereon will be damped, said combined biasing and hydraulic braking means including a cylinder member, a piston member slidably engaging the interior of said cylinder member, one of said members being connected to said support means and the other of said members being connected to said lever means, and spring means arranged entirely within said cylinder member and operatively connected to said members for biasing the same into a predetermined position relative to each other.

3. A seating arrangement, comprising, in combination, support means; lever means having in the region of one free end thereof a seat portion, said lever means being mounted on said support means for pivotal movement about a pivot axis intermediate the free ends of said lever means between a first position wherein said seat portion occupies an uppermost position and a second position wherein said seat portion occupies a lowermost position; and combined biasing and hydraulic braking means connected to said support means and to said lever means in the region of the opposite free end thereof for biasing said lever means toward said first position thereof and for braking turning movement of said lever means from said first position thereof to said second position thereof whereby said lever means will be maintained in said first position thereof when said seat portion is empty and the downward movement of said seat portion of said lever means under the influence of a weight thereon will be damped, said combined biasing and hydraulic braking means including a cylinder member, a piston member slidably engaging the interior of said cylinder member, one of said members being connected to said support means and the other of said members being connected to said lever means, valve means operatively connected to said piston member for permitting braking fluid to flow therethrough at a first rate during movement of said piston member relative to said cylinder member in a direction corresponding to movement of said lever means from said first position thereof to said second position thereof, opening means operatively associated with said piston member for permitting braking fluid to flow therethrough at a second rate smaller than said first rate during movement of said piston member relative to said cylinder member in the opposite direction, and spring means arranged entirely within said cylinder member and operatively connected to said members for urging said piston member in said opposite direction.

4. A seating arrangement, comprising, in combination, support means; lever means including first and second lever elements, said first lever element having in the region of one free end thereof a first seat portion and mounted on said support means for pivotal movement about a first horizontal pivot axis intermediate the free ends of said first lever element between a first position wherein said first seat portion occupies an uppermost position and a second position wherein said first seat portion occupies a lower most position, said first seat portion being spaced a first distance from said first pivot axis, said second lever element having in the region of one free end thereof a second seat portion and mounted on said support means for pivotal movement about a second horizontal pivot axis in the region of the opposite free end of said second lever element, said first pivot axis being arranged above said second pivot axis and spaced a second distance therefrom, said first and second lever elements being adapted to be connected to each other at their respective seat portions so that the same are at all times spaced said second distance from each other so that said lever elements are at all times parallel to each other and so that said first and second seat portions will move in unison during turning movement of said lever elements about their respective pivot axes; and combined biasing and damping means connected to said support means and to said first lever element in the region of the opposite free end thereof for biasing said first lever element toward said first position thereof and for damping turning movement of said first lever element from said first position thereof to said second position thereof whereby said first lever element will be maintained in said first position thereof when said seat portions are empty and the downward movement of said seat portions under the influence of a weight thereon will be damped.

5. A seating arrangement, comprising, in combination, support means; lever means including first and second lever elements, said first lever element having in the region of one free end thereof a first seat portion and mounted on said support means for pivotal movement about a first horizontal pivot axis intermediate the free ends of said first lever element between a first position wherein said first seat portion occupies an uppermost position and a second position wherein said first seat portion occupies a lowermost position, said first seat portion being spaced a first distance from said first pivot axis, said second lever element having in the region of one free end thereof a second seat portion and mounted on said support means for pivotal movement about a second horizontal pivot axis in the region of the opposite free end of said second lever element, said first pivot axis being arranged above said second pivot axis and spaced a second distance therefrom; combined seat and link means connected to said lever elements at their respective seat portions for spacing the latter said second distance from each other so that said lever elements are at all times parallel to each other and so that said combined seat and link means and said first and second seat portions will move in unison during turning movement of said lever elements about their respective pivot axes; and combined biasing and damping means connected to said support means and to said first lever element in the region of the opposite free end thereof for biasing said first lever element toward said first position thereof and for damping turning movement of said first lever element from said first position thereof to said second position thereof whereby said first lever element will be maintained in said first position thereof when said combined seat and link means is empty and the downward movement of said combined seat and link means under the influence of a weight thereon will be damped.

6. A seating arrangement, comprising, in combination, support means; lever means including first and second lever elements, said first lever element having in the region of one free end thereof a first seat portion and mounted on said support means for pivotal movement about a first horizontal pivot axis intermediate the free ends of said first lever element between a first position wherein said first seat portion occupies an uppermost position and a second position wherein said first seat portion occupies a lowermost position, said first seat portion being spaced a first distance from said first pivot axis, said second lever element having in the region of one free end thereof a second seat portion and mounted on said support means for pivotal movement about a second horizontal pivot axis in the region of the opposite free end of said second lever element, said first pivot axis being arranged above said second pivot axis and spaced a second distance therefrom; combined seat and link means connected to said lever elements at their respective seat portions for spacing the latter said second distance from each other so that said lever elements are at all times parallel to each other and so that said combined seat and link means and said first and second seat portions will move in unison during turning movement of said lever elements about their respective pivot axes; combined biasing and damping means connected to said support means and to said first lever element in the region of the opposite free end thereof for biasing said first lever element toward said first position thereof and for damping turning movement of said first lever element from said first position thereof to said second position thereof whereby said first lever element will be maintained in said first position thereof when said combined seat and link means is empty and the downward movement of said combined seat and link means under the influence of a weight thereon will be damped; and stop means connected to said support means and to said second lever element for limiting upward and downward movement of said combined seat and link means.

References Cited in the file of this patent
UNITED STATES PATENTS

| | | |
|---|---|---|
| Re. 19,327 | Shuster | Sept. 25, 1934 |
| 90,985 | Berg et al. | June 8, 1869 |
| 458,136 | Wilder | Aug. 18, 1891 |
| 1,037,477 | Hall | Sept. 3, 1912 |
| 1,135,923 | Reynolds | Apr. 13, 1915 |
| 1,435,585 | Coleman | Nov. 14, 1922 |
| 1,887,287 | Churchill | Nov. 8, 1932 |
| 2,544,106 | Ray | Mar. 6, 1951 |
| 2,567,346 | Petermeier | Sept. 11, 1951 |
| 2,680,472 | Hempe | June 8, 1954 |